Figure 1:
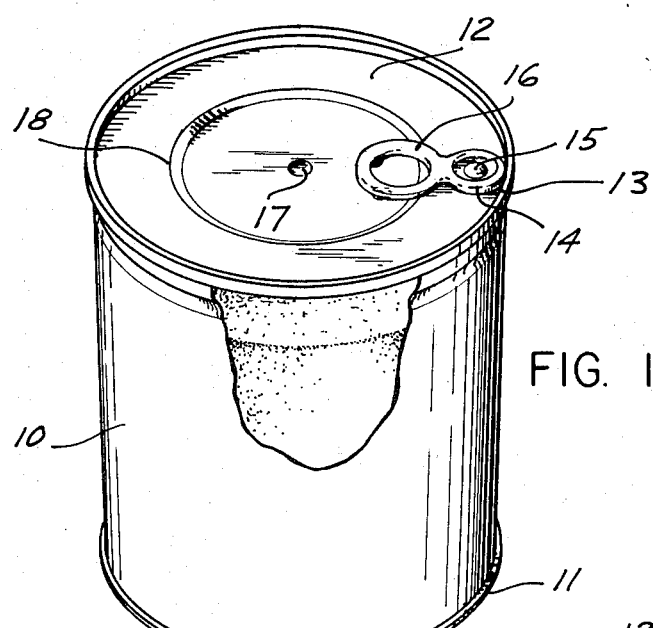

United States Patent [19]

Jakobsen

[11] 3,720,348
[45] March 13, 1973

[54] OPENING DEVICE FOR CANS
[76] Inventor: Kjell Mossvoll Jakobsen, Ronnbackegatan 81, Malmo, Sweden
[22] Filed: June 29, 1970
[21] Appl. No.: 50,477

[30] Foreign Application Priority Data
July 1, 1969 Sweden ...............................9314/69

[52] U.S. Cl. ......................220/54, 220/27, 220/44 R
[51] Int. Cl. ..............................................B65d 17/24
[58] Field of Search......................220/44, 54, 27, 48

[56] References Cited
UNITED STATES PATENTS 3,441,169  4/1969  Dunn et al. .........................220/44 X
3,416,699  12/1968 Bozek................................220/44 X
3,477,608  11/1969 Fraze.................................220/44 X Primary Examiner—George T. Hall
Attorney—Hane, Baxley & Spiecens

[57] ABSTRACT

A vacuum sealed can which has in its top a scored area that can be pulled open by means of a pull tab and particularly a can of the type which is filled with powderized material such as coffee or dried milk, has spaced apart from the scored area a weakened preferably depressed wall portion. Piercing of this latter area prior to pulling the tab gradually releases the vacuum in the can thereby avoiding scattering of at least part of the contents of the can by abrupt release of the vacuum upon pulling of the tab.

16 Claims, 10 Drawing Figures

INVENTOR.
KJELL MOSVOLL JAKOBSEN
BY
ATTORNEYS

OPENING DEVICE FOR CANS

A situation that occurs when a coffee can is to be opened is that in certain cases the coffee is ejected from the can just when the hole is made, when the pressure rapidly changes. It is not, as has hitherto been assumed, only a question of a local removal of coffee from the surface of the coffee in the can, but practically the entire quantity of coffee in the can is lifted at the sudden change of pressure, and in case of careless opening a considerable quantity of coffee is very liable to be ejected. Hitherto the problem has not been very great, when can openers have been used, since the cutting member of such an opener, when the opening movement commences, has been pressed down into the plate until this has been pierced, the cutting member then remaining in the opening, so that the gas can only escape slowly around the edges of the cutting member. For new types of tin cans, however, endeavors are made to eliminate the need to use special can openers, and endeavors have been made to provide coffee cans with built-in openers, so-called pull tabs, comprising a score line along which a section of the cover is remoed by means of a tab which has been riveted to the cover.

When the score line is broken through, however, a large opening is immediately formed, through which the gas rapidly escapes, together with a large quantity of coffee. This is a considerable disadvantage of containers of this type, and the purpose of the present invention is to eliminate this, in that the cover is provided with an opening section consisting of a part of the cover which has a reduced thickness, which section can be pierced by a pointed or narrow blunt object.

The opening section makes it easy to provide the cover with an opening before the cover of the can is opened with the pull tab, whereby the gas is let out slowly. The opening section is thus pierced with a pointed object, said object then penetrating into the can, and before the object is removed or before the cover is opened, a sufficient quantity of gas will have time to escape to prevent the coffee from being ejected.

It has proved that in certain cases it is advisable to protect the penetrable part of the cover, and according to a further development of the invention. This can be achieved in that, in the cover of the can from below, a more or less protuberant part i spressed up. Said protuberant part is pressed down in its central part. A crater-shaped part with a bottom is thereby formed. When this is pressed down, it is advisable to allow the bottom to lie at a level below the level of the cover surface. In the bottom of the crater, more or less line-shaped depressions are made, so that the material is thinned along these depressions. The depressions can have the form of a cross, a spiral, a circle or parts thereof or a very small circular depression. In other words, the thinned part of the cover will be substantially smaller.

By making the penetrable part of the wall in the way described above, the advantage is also gained that a longer life of the tool which is to achieve the thinning of the wall through which the penetration is to take place will be obtained. There will be by far much less wear of the tool that is to achieve said line-shaped depressions than of the tool that is to achieve depressions of larger surfaces.

The invention will now be described in more detail in connection with the attached three drawings, which show different examples of an embodiment, but it should be obvious that a plurality of variations are possible within the scope of the following description and claims.

Figure 2:
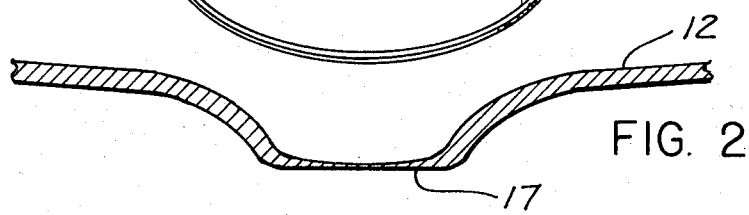
Figure 3:
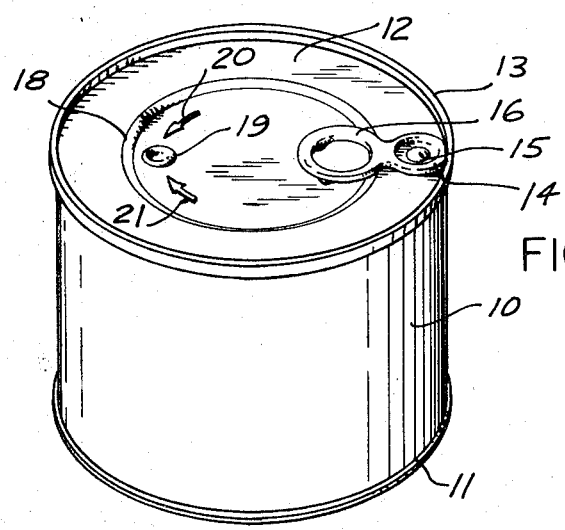
Figure 4:
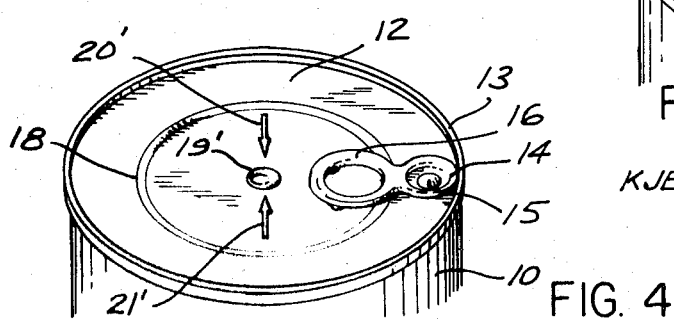

FIG. 1 shows in perspective a partly cut-away coffee can according to the invention, FIG. 2 shows a section of an example chosen of an embodiment of an opening section according to the invention, FIGS. 1–3 show cans in the covers of which a crater-shaped formation is arranged, which is placed in three different positions and which crater has a depression in its bottom for penetration, FIG. 4 shows a part of a cover according to the foregoing figure, containing a crater-shaped formation with a penetration depression in the bottom of the crater, and FIGS. 5–10 show a crater according to FIG. 4, in which the penetration depressions have different embodiments.

The can consists, in the usual way, of a body 10, a bottom 11 and a cover 12. The bottom 11 and the cover 12 are attached by means of double seams to the body, and seal the can gas-tight. The cover 12, which is intended to be opened entirely, has a score line 13 running around the periphery of the cover, along which the cover is separated by being ripped off from the part of the cover which is attached by means of a double seam to the body, with the aid of the tab 14, which is fastened to the cover 12 by means of the rivet 15. The tab 14 has a finger ring 16 which, when it is lifted, presses down the opposite end of the tab and therewith the section of the cover adjacent to the score line, which breaks, after which the entire cover can easlily be torn off.

In the center of the cover there is a penetrable section 17, which according to FIG. 2 consists of a thinned section of the cover 12. This section has been made by stamping a recess in the cover, whereby the material is stretched and thinned. The material is thinned to such an extent that it can easily be pierced by hand with a narrow or pointed object, for instance a pencil, match, scissors, knife or any similar object. The plate material around the penetrable section gives the strength required in order to prevent excessive penetration if, for instance, a knife is used. In order to provide sufficient rigidity and further certainty that a penetration made is not extended unintentionally, reinforcing strips can be arranged partly or entirely around the penetrable section. These reinforcing strips can consist of, for instance, one or several raised or depressed portions above or below the plane of the cover.

The thinned opening section can also be formed by pressing the plate material to flowing, and a thickening of the material around the penetrable section can then form said reinforcing strip.

For production-technical reasons, the penetrable section is particularly made centrally in the cover. There will thereby never be any risk for incorrect localization of reference arrows and text required for opening instructions in relation to the penetrable section. However, it is obvious that also other positions can have their advantages, and the penetrable section can for instance be located at or in the vicinity of the pull tab. It can particularly be located in the finger ring, so that increased safety against unintentional opening is obtained. It can also be located in the head of the rivet holding the pull tab, whereby the thinning required can be obtained in one and the same operation when making the rivet through pressing of the plate material.

The penetrable section can also be located at the score line, in order to enable an opening with the aid of a point or the like, which can be formed on the pull tab and particularly then adjacent to a raised or depressed section of the plate cover, parallel to the score line, which can form a reinforcing strip. This raised or depressed section of the cover, which serves to reinforce the cover, anc also be located nearer the center of the cover for instance as shown at 18 in FIG. 1.

Figure 5:
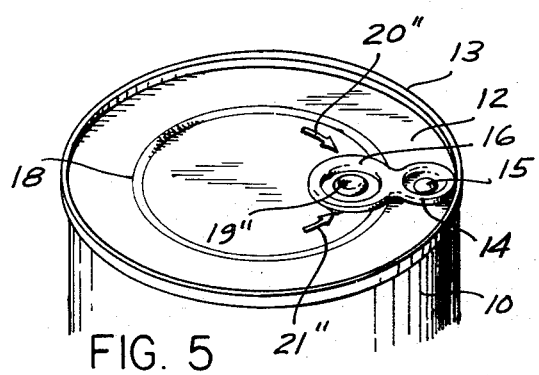

The can cover 12 in FIGS. 3–5 differs from the can cover 12 in FIG. 1 in that it contains a crater-shaped part 19, which can have three different positions, viz. diametrically opposite the pull tab 16, in the center of the can cover, and located inside the ring of the pull tab 16. Attention is drawn to the crater-shaped part in the can cover with the aid of the two arrows 20 and 21.

The part of the can cover which is nearest to the crater-shaped part 19 has been given the reference designation 22, as will be clearly noted from FIG. 4. The crater-shaped part is formed by an ascending conical wall 23, which thereafter goes over into the inner wall 24 of the crater. The crater has a bottom surface 25, and in said bottom surface a depression 26 is made. Penetration of the can is to takw place at said depression, by means of some suitable tool.

The crater mentioned above is obtained in that a protuberance is first pressed up in the can cover. Thereafter the central part of the protuberance is pressed down, which has the result that the wall parts 23 and 24 and the bottom 25 are abtained. In said bottom a depression is thereafter pressed. In order to obtain the crater-shaped part with depression, three operations are thus required, viz. one pressing operation upwards and two pressing operations downwards.

As regards the location of the bottom 25 in relation to the wall part 22, it is appropriate that the bottom 25 has a position below the wall part 22.

Figure 6:
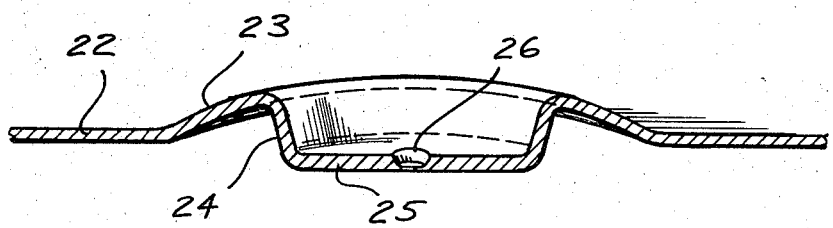
Figure 7:
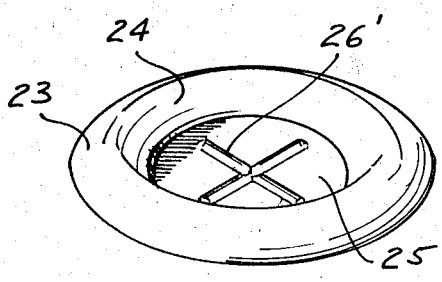
Figure 8:
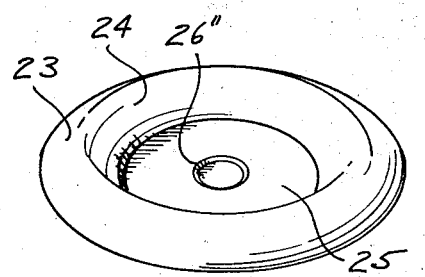
Figure 9:
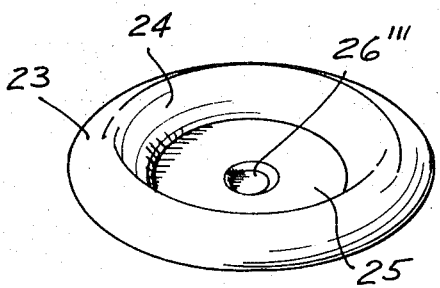
Figure 10:
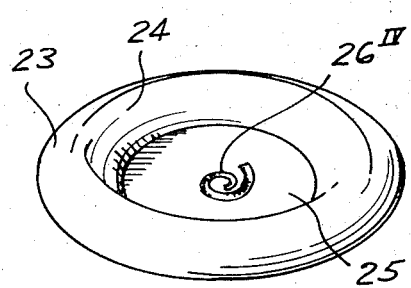

The depression 26 can have various embodiments. An extremely appropriate embodiment is shown if FIG. 5, where the depression has been given the form of a cross 26'. Another embodiment is shown in FIG. 6, where the depression has the form of a small circular surface 26'' and finally, in FIG. 8 the depression has been given the form of a spiral 26$^{IV}$. The primary condition for the depressions is that they occupy as small a surface as possible in the bottom of the crater.

It should be obvious that, although the invention is described only in connection with coffee cans under pressure, the arrangement according to the invention can also be applied to cans under vacuum, for instance glass jars with vacuum sealed plate covers. The penetrable section then serves as a possibility of equalizing the pressure, so that the cover can more easily be removed.

I claim:
1. A sealed pressurized or evacuated container having attached to one of the walls of the container a pull tab defining in said wall a weakened wall section for removing said wall section by pulling the tab, and further including in one of the container walls a second weakened wall section, said second weakened wall section being readily penetrable independently of pulling said tab for equalizing the pressure within the container to the atmospheric pressure prior to pulling the tab.

2. Container according to claim 1 wherein said second weakened wall section has a lesser thickness than the adjacent wall portions of the container.

3. Container according to claim 1 wherein said second weakened wall section is in the form of an elongate depression in the top wall of the container, the bottom of said depression including a readily penetrable area having a wall thickness less than that of adjacent wall portions of the depression.

4. Container according to claim 1, characterized in that the penetrable section is located adjacent to the pull tab.

5. Container according to claim 1, characterized in that the penetrable section is located within a wall portion limited by a part of the pull tab made in the form of a finger ring.

6. Container according to claims 1, characterized in that the penetrable section is located in a rivet fastening the pull tab, made in one piece with the container as a raised part of a container wall.

7. Container according to claim 1, characterized in that the penetrable section is formed by a recess in a container wall.

8. Container according to claim 7, characterized in that the wall portion defining the recess is thinnest in its deepest part.

9. Container according to claim 1, characterized in that the penetrable section is surrounded at least partly by reinforcing strips.

10. Container according to claim 9, characterized in that the reinforcing strips consist of raised or depressed portions of the respective wall portion of the container.

11. Container according to claim 9, characterized in that the reinforcing strips consist of thickened portions of the wall material 12. Container according to claim 3, characterized in that the penetrable depression is in the form of two crossed lines.

13. Container according to claim 3, characterized in that the penetrable depression is in the form of a spiral line.

14. Container according to claim 3, characterized in that the penetrable depression is in the form of at least part of a circular line.

15. Container according to claim 3, characterized in that the penetrable depression has a circular outline.

16. Container according to claim 3, characterized in that the bottom of the depression is surrounded by a raised rib.

* * * * *